United States Patent

[11] 3,561,472

[72] Inventors Ted L. Lamb
San Lorenzo;
Chris O. Schmitz III, Alamo, Calif.
[21] Appl. No. 732,966
[22] Filed May 29, 1968
[45] Patented Feb. 9, 1971
[73] Assignee Parker-Hannifin Corporation
Cleveland, Ohio
a corporation of Ohio

[54] CHECK VALVE WITH RESTRICTED BACKFLOW
13 Claims, 3 Drawing Figs.
[52] U.S. Cl. ................................................ 137/513.3,
137/533.11, 137/533.17, 137/533.27
[51] Int. Cl. ....................................................... F16k 15/14
[50] Field of Search........................................... 137/513.3,
533.11, 533.17, 533.19, 533.21, 533.27, 539,
543.15; 29/(Inquired)

[56] References Cited
UNITED STATES PATENTS
| 382,655 | 5/1888 | Montgomery | 137/533.11 |
| 847,818 | 3/1907 | Porst | 137/513.3 |
| 2,591,060 | 4/1952 | Garretson | 137/513.3 |

Primary Examiner—William F. O'Dea
Assistant Examiner—William H. Wright
Attorney—Diller, Brown, Ramik & Holt ABSTRACT: A check valve providing free flow in one direction and restricted flow in the other, the valve element being a ball and the restricted flow passing through a clearance between a bore through the ball and a stem upon which the ball is slidably mounted, the stem being carried by a spider that is deformably gripped between clamping shoulders on separably connected housing parts so as to permit other shoulders on such parts to sealingly engage despite manufacturing dimensional inaccuracies.

PATENTED FEB 9 1971　　　　　　　　　　　　　　3,561,472

INVENTORS
TED L. LAMB &
CHRIS O. SCHMITZ, III

BY
Mason, Porter, Diller & Brown
ATTORNEYS

CHECK VALVE WITH RESTRICTED BACKFLOW

BACKGROUND OF THE INVENTION

In check valves that provide restricted backflow it is frequently desirable to keep the pressure drop in the free flow direction as low as possible and yet provide for a valve that is inexpensive and simple to assemble and disassemble. It is also desirable to provide a sealed connection between the valve housing parts without the use of separate gaskets with the attendant problems of handling an extra part and obtaining replacements when the valve is reassembled after disassembly.

BRIEF DESCRIPTION

The invention meets the above objectives by providing a pair of threadedly connected housing parts having cooperating clamping and sealing shoulders and containing a spider gripped by the clamping shoulders and which carries a stem upon which a ball having a bore therethrough is slidably mounted for easy assembly and disassembly. Backflow occurs through a clearance between the stem and the bore through the ball. The clamping shoulders are offset and the spider is slightly deformable thereby so as to permit the sealing shoulders to engage despite manufacturing inaccuracies of the parts.

DESCRIPTION

Figure 1:
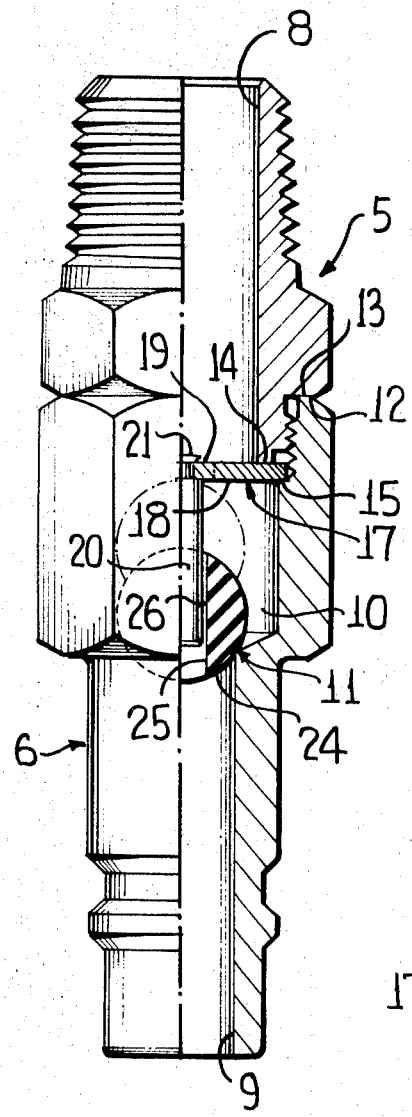
FIG. 1 is a view partly in cross section and partly in side elevation.
Figure 2:
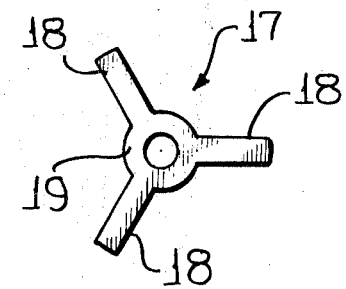
FIG. 2 is an end view of the spider.

The illustrated embodiment comprises a pair of housing parts 5 and 6 threadedly connected at 7 and having respective flow passages 8 and 9 therethrough that communicate with an enlarged valve chamber 10 having a valve seat 11 at one end.

The housing parts have sealingly engageable shoulders 12, 13 and also have radially offset shoulders 14, 15 that grip the outer ends of legs 18 of a spider 17 that has a central apertured hub 19 to which a cylindrical stem 20 is attached by peening as at 21. Slidably mounted on stem 20 is a ball valve element 24 which may be of metal but is preferably of slightly deformable elastomeric or plastic material. The ball has a bore 25 therethrough for receiving stem 20 with a slight clearance 26 therebetween.

Figure 3:
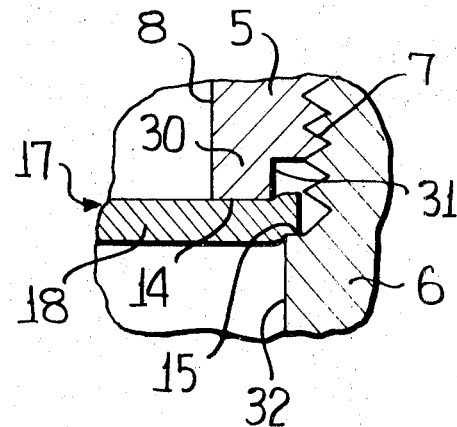
FIG. 3 is a fragmentary enlarged cross section view showing slight deformation of the spider legs by the clamping shoulder of the housing.

As shown in FIG. 3, shoulder 14 on housing part 5 is formed on a rib 30 having a cylindrical outer surface 31 of a diameter appreciably smaller than the minor diameter of threads 7 while chamber wall 32 of housing part 6 is of a diameter slightly larger than that of surface 31 so that clamping shoulders 14, 15 are radially offset from each other a small amount. Spider 17 is of stainless steel or other slightly deformable material so that when the spider legs 18 are clamped between shoulders 14, 15 the ends of the legs may be slightly indented or deformed as shown in FIG. 3 to permit slight variation in the relative axial positioning of shoulders 14, 15. When shoulders 12 and 13 are in sealing contact with each other, as shown in FIG. 1, this variation in the final axial spacing of shoulders 14, 15 accommodates manufacturing inaccuracies in the parts.

Assembly of the parts is quickly and easily accomplished. For example, with housing 6 held in a vertical position as shown, ball 24 is inserted against seat 11 and stem 20 with the spider 17 attached is inserted into bore 25 until spider legs 18 engage seat 15. Housing part 5 is then threaded to part 6 until shoulders 12 and 13 are in tight sealing engagement. When this occurs shoulders 14 and 15 will grip the spider legs 18 as shown in FIG. 3.

To disassemble, the housing parts 5 and 6 are unthreaded and when housing part 6 is inverted the spider and ball simply drop out and the ball may then be slid off from the stem.

Although a gasket between or adjacent shoulders 12 and 13 is not necessary, such a gasket may be used if desired.

In operation, fluid flowing through passage 9 toward ball 24 moves the latter from seat 11 and flows around the ball and through the spaces between legs 18 of the spider to flow passage 8. The outer diameter of hub 19 exceeds the diameter of ball bore 25 by an amount at least equal to the radial width of clearance 26 so that the upper edge of the ball engages hub 19 in full annular contact to limit opening travel of the ball regardless of whether the ball is centered on stem 20.

Upon a reversal of flow, the fluid carries the ball to its closed position against seat 11 but a restricted backflow of fluid occurs through clearance 26 between stem 20 and bore 25 through the ball.

Although only one form of the invention has been illustrated and described, various modifications may be made therein within the scope of the invention as defined by the claims.

I claim:

1. A valve comprising a pair of separably connected housing parts providing a through flow passage and an intermediate chamber, a spider at one end of the chamber traversing the flow passage and having openings connecting the flow passage with one end of the chamber, a valve seat at the other end of the chamber, a ball valve in the chamber with a substantial clearance with the wall thereof to permit substantial flow of fluid through the clearance when the ball valve is not on said seat, said ball having a bore therethrough, a stem carried by the spider and having an end projecting into said bore, said spider being gripped between clamping shoulders formed on said parts, and said clamping shoulders being radially offset to permit slight deformation of the spider portion gripped thereby whereby the sealing shoulders may engage despite manufacturing inaccuracies in the dimensioning of the parts.

2. The valve of claim 1 in which said spider has a central hub from which the stem projects, and said ball is engageable with the hub to limit movement of the ball away from said seat.

3. The valve of claim 2 in which the outer diameter of the hub exceeds the diameter of the bore by an amount no less than the radial width of the clearance.

4. The valve of claim 2 in which the parts have engaged shoulders forming a seal therebetween.

5. The valve of claim 1 in which the radially outermost of said clamping shoulders is of narrower width than the radially inner clamping shoulder.

6. The valve of claim 1 wherein the grip spider portion is devoid of threads and is held in position solely by the gripping forces of said clamping shoulders.

7. The valve of claim 1 wherein said spider is constructed from deformable material.

8. The valve of claim 6 wherein said spider is constructed from deformable material.

9. The valve of claim 1 wherein said end is of a slightly less diameter than said bore to provide a slight clearance therebetween to permit restricted flow of fluid therethrough when the ball is on said seat.

10. The valve of claim 1 including means for limiting the clamping force exerted upon said grip spider portion by said clamping shoulders.

11 A valve comprising a pair of housing parts connected by thread means providing an inlet passage, an outlet passage, and a valve chamber therebetween, an annular valve seat defined by a first of said housing parts, said annular valve seat facing in a direction toward a second of said housing parts, a spider at an end of said chamber remote from said valve seat traversing the chamber and having openings connecting the chamber with the outlet passage, a ball valve in the chamber with a substantial clearance with the wall thereof to permit substantial flow of fluid through the clearance when the ball valve is not on said valve seat, said ball valve having a bore therethrough, a stem carried by said spider projecting toward said inlet passage and into said bore, said spider being gripped between clamping shoulders formed on said housing parts, and means radially exterior of and apart from said thread means for limiting the clamping force exerted upon said spider by said clamping shoulders.

12. The valve of claim 11 wherein said clamping force limiting means are exterior abutting surfaces of said housing parts.

13. The valve of claim 10 wherein said clamping force limiting means are exterior abutting surfaces of said housing parts.